US012811526B2

(12) United States Patent
Kinoshita

(10) Patent No.: US 12,811,526 B2
(45) Date of Patent: Nov. 24, 2026

(54) ACTUATOR DEVICE, METHOD OF CONTROLLING ACTUATOR DEVICE, AND MOBILE OBJECT

(71) Applicant: SONY GROUP CORPORATION, Tokyo (JP)

(72) Inventor: Masaya Kinoshita, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 188 days.

(21) Appl. No.: 18/712,257

(22) PCT Filed: Oct. 6, 2022

(86) PCT No.: PCT/JP2022/037500
§ 371 (c)(1),
(2) Date: May 22, 2024

(87) PCT Pub. No.: WO2023/100473
PCT Pub. Date: Jun. 8, 2023

(65) Prior Publication Data

US 2025/0015741 A1 Jan. 9, 2025

(30) Foreign Application Priority Data

Nov. 30, 2021 (JP) ................................ 2021-194138

(51) Int. Cl.

| | |
|---|---|
| ***H02P 23/14*** | (2006.01) |
| ***F16H 19/08*** | (2006.01) |
| ***H02P 23/12*** | (2006.01) |

(52) U.S. Cl.
CPC ............. *H02P 23/14* (2013.01); *H02P 23/12* (2013.01); *F16H 19/08* (2013.01)

(58) Field of Classification Search
CPC .. H02P 23/14; H02P 23/12; H02P 6/16; H02P 6/06; H02P 29/00; F16H 19/08
USPC .............................. 318/400.04, 400.01, 700
See application file for complete search history.

(56) References Cited

U.S. PATENT DOCUMENTS

| | | | | |
|---|---|---|---|---|
| 8,169,169 | B2 * | 5/2012 | Hass | E05F 15/63 361/84 |
| 8,692,490 | B2 * | 4/2014 | Lebrun | H02P 6/16 318/400.01 |
| 10,392,849 | B2 * | 8/2019 | Xiao | E05F 15/611 |

FOREIGN PATENT DOCUMENTS

| | | | |
|---|---|---|---|
| JP | 2003-018880 | A | 1/2003 |
| JP | 2003-070284 | A | 3/2003 |
| JP | 2009-005574 | A | 1/2009 |
| JP | 2012-171069 | A | 9/2012 |

OTHER PUBLICATIONS

International Search Report and Written Opinion of PCT Application No. PCT/JP2022/037500, issued on Nov. 15, 2022, 09 pages of ISRWO.

* cited by examiner

*Primary Examiner* — David Luo
(74) *Attorney, Agent, or Firm* — CHIP LAW GROUP

(57) ABSTRACT

Provided is an actuator device that includes a motor whose rotation is controlled by a drive circuit, a gearbox that decelerates or accelerates torque of the motor, an angle sensor that detects a rotation angle of an output shaft of the gearbox, and a feedback circuit that generates feedback for control of the motor on the basis of internal information of the motor used in the drive circuit and the rotation angle of the output shaft detected by the angle sensor.

12 Claims, 4 Drawing Sheets

ACTUATOR DEVICE, METHOD OF CONTROLLING ACTUATOR DEVICE, AND MOBILE OBJECT

CROSS REFERENCE TO RELATED APPLICATIONS

This application is a U.S. National Phase of International Patent Application No. PCT/JP2022/037500 filed on Oct. 6, 2022, which claims priority benefit of Japanese Patent Application No. JP 2021-194138 filed in the Japan Patent Office on Nov. 30, 2021. Each of the above-referenced applications is hereby incorporated herein by reference in its entirety.

TECHNICAL FIELD

The present disclosure relates to an actuator device, a method of controlling the actuator device, and a mobile object.

BACKGROUND ART

Generally, in an actuator device, an output from a motor is decelerated or accelerated to an appropriate torque by a gearbox or the like.

For example, Patent Document 1 below discloses a robot joint including a motor, a speed reducer that transmits torque from the motor to a link, a first detection unit that detects a rotation angle of the motor, and a second detection unit that detects a rotation angle of an output shaft of the speed reducer. The robot joint disclosed in Patent Document 1 can reduce the influence of backlash or the like generated in the speed reducer by correcting the position instruction to the motor on the basis of the detection result by the first detection unit and the detection result by the second detection unit. With this configuration, the robot joint disclosed in Patent Document 1 can control the link connected to the robot joint with higher positional accuracy.

CITATION LIST

Patent Document

Patent Document 1: Japanese Patent Application Laid-Open No. 2012-171069

SUMMARY OF THE INVENTION

Problems to be Solved by the Invention

However, in a case where a large number of detection units (for example, an angle sensor and the like) are provided in the actuator device, the weight, volume, and cost of the actuator device increase unfortunately.

Therefore, the present disclosure proposes a novel and improved actuator device capable of performing highly accurate position control with a smaller number of sensors, a method of controlling the actuator device, and a mobile object including the actuator device.

Solutions to Problems

According to the present disclosure, there is provided an actuator device including: a motor whose rotation is controlled by a drive circuit; a gearbox that decelerates or accelerates torque of the motor; an angle sensor that detects a rotation angle of an output shaft of the gearbox; and a feedback circuit that generates feedback for control of the motor on the basis of internal information of the motor used in the drive circuit and the rotation angle of the output shaft detected by the angle sensor.

According to the present disclosure, there is also provided a method of controlling an actuator device, the method including: controlling rotation of a motor of the actuator device by a drive circuit; decelerating or accelerating torque of the motor by a gearbox of the actuator device; detecting a rotation angle of an output shaft of the gearbox by an angle sensor; and generating feedback for control of the motor by a feedback circuit on the basis of internal information of the motor used in the drive circuit and the rotation angle of the output shaft detected by the angle sensor.

According to the present disclosure, there is further provided a mobile object including an actuator device, the actuator device including: a motor whose rotation is controlled by a drive circuit; a gearbox that decelerates or accelerates torque of the motor; an angle sensor that detects a rotation angle of an output shaft of the gearbox; and a feedback circuit that generates feedback for control of the motor on the basis of internal information of the motor used in the drive circuit and the rotation angle of the output shaft detected by the angle sensor.

MODE FOR CARRYING OUT THE INVENTION

Hereinafter, a preferred embodiment of the present disclosure will be described in detail with reference to the accompanying drawings. Note that components having substantially the same functional configuration are denoted by the same reference signs, and redundant description is omitted in the present specification and drawings.

Note that the description will be given in the following order.

1. Outline
2. Configuration example
3. Control method
4. Application example

1. Outline

Figure 1:
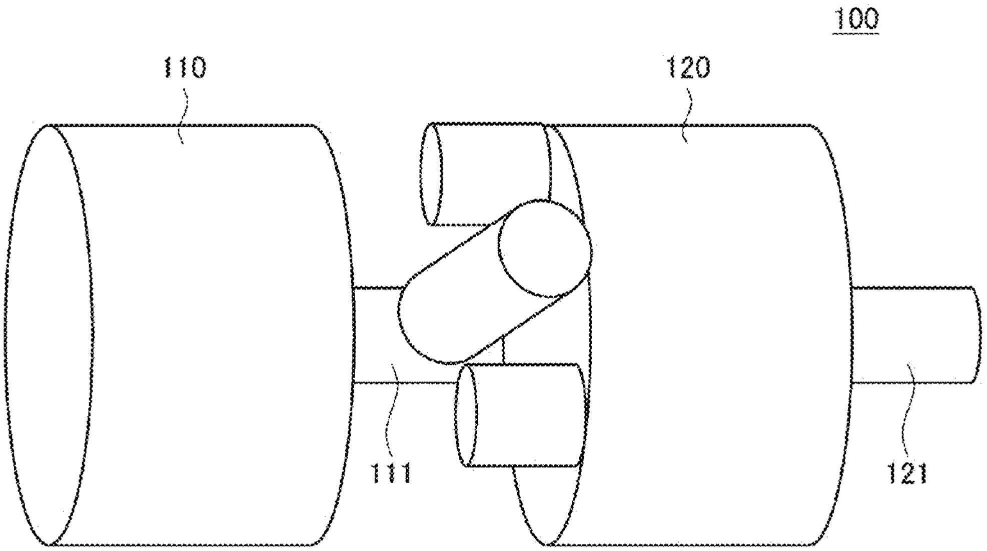
FIG. 1 is a schematic perspective view illustrating an outline of an actuator device according to an embodiment of the present disclosure.
Figure 2:
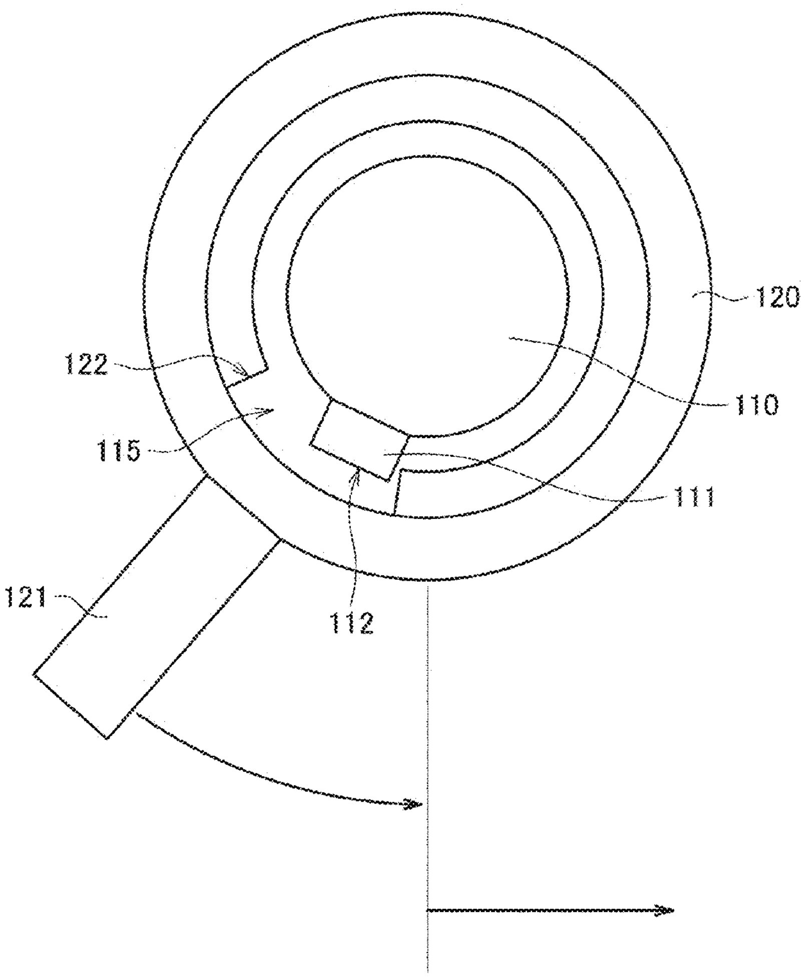
FIG. 2 is a schematic cross-sectional view for explaining a backlash generated in the actuator device.

First, an outline of an actuator device according to an embodiment of the present disclosure will be described with reference to FIGS. 1 and 2. FIG. 1 is a schematic perspective view illustrating an outline of an actuator device 100 according to the present embodiment. FIG. 2 is a schematic cross-sectional view for explaining a backlash generated in the actuator device 100.

As illustrated in FIG. 1, the actuator device 100 according to the present embodiment includes a motor 110 and a gearbox 120.

The motor 110 is a torque source for the actuator device 100. A motor shaft 111 rotates to transmit the torque generated by the motor 110 to the gearbox 120. Specifically, rotation of the motor 110 is controlled by a drive circuit, and the motor 110 converts electric energy into mechanical energy of rotation. For example, the motor 110 is a brushless motor. The brushless motor can generate torque by controlling a current by means of an inverter circuit according to a phase of a magnetic field inside the motor 110.

The gearbox 120 decelerates or accelerates the torque input from the motor shaft 111 and outputs the torque to an output shaft 121. Specifically, the gearbox 120 may decelerate or accelerate the torque transmitted from the motor shaft 111 using mechanical elements in mesh. For example, the gearbox 120 may decelerate or accelerate the torque transmitted from the motor shaft 111 using mechanical elements having teeth in mesh such as gears, bevel gears, worm gears, or sprockets. For example, the gearbox 120 may be a wave gear device.

In the actuator device 100, the torque generated by the motor 110 is transmitted to the gearbox 120 via the motor shaft 111, then decelerated or accelerated in the gearbox 120, and output from the output shaft 121 to the outside. At this time, positional deviation due to a backlash occurs between the motor shaft 111 of the motor 110 and the output shaft 121 of the gearbox 120. The backlash is a gap intentionally provided between mechanical elements that move in mesh, such as gears. Due to the provision of the backlash, the mechanical elements that move in mesh can be prevented from being hindered from rotating by interference between the teeth.

For example, as shown in FIG. 2, the motor shaft 111 of the motor 110 transmits torque to the gearbox 120 due to the mechanical contact between a protrusion 112 and a recess 122 in mesh. In this regard, a gap 115 (that is, the backlash) is intentionally provided between the protrusion 112 and the recess 122 in the rotation direction of the motor shaft 111 in order to prevent interference between the protrusion 112 and the recess 122 due to the rotation of the motor shaft 111.

However, when the motor 110 rotating in one direction is caused to rotate in the opposite direction, the gap 115 may cause a positional deviation corresponding to the gap 115 between the motor shaft 111 and the gearbox 120. In addition, the gap 115 may cause unstable contact between the protrusion 112 and the recess 122, and therefore vibration may occur when the motor 110 rotates. Such positional deviation or vibration due to the gap 115 deteriorates positioning accuracy of the output shaft 121 of the actuator device 100.

Therefore, for example, an angle sensor is provided to each of the motor shaft 111 of the motor 110 and the output shaft 121 of the gearbox 120. This allows the actuator device 100 to control the motor 110 on the basis of the angle detected by each of the angle sensors, so that it is possible to prevent a decrease in positioning accuracy due to the backlash between the motor shaft 111 and the gearbox 120 and a backlash inside the gearbox 120.

However, providing the angle sensor in each of the motor shaft 111 of the motor 110 and the output shaft 121 of the gearbox 120 increases the cost of the actuator device 100. In addition, in a case where the angle sensor is provided to each of the motor shaft 111 of the motor 110 and the output shaft 121 of the gearbox 120, the weight and volume of the entire actuator device 100 increase. Since an articulated robot device or mobile object is provided with a large number of actuator devices 100 for driving joints, an increase in the weight and volume of each of the actuator devices 100 consequently increases the operation load on the robot device or mobile object.

The technology according to the present disclosure has been conceived in view of the above circumstances. The technology according to the present disclosure is a technology for improving positioning accuracy of the output shaft 121 by using internal information of the motor 110 used to drive the motor 110 and an angle detected by an angle sensor provided on the output shaft 121. According to the technology according to the present disclosure, the actuator device 100 can control the angle of the output shaft 121 with high accuracy without any angle sensor on the motor shaft 111.

2. Configuration Example

Figure 3:
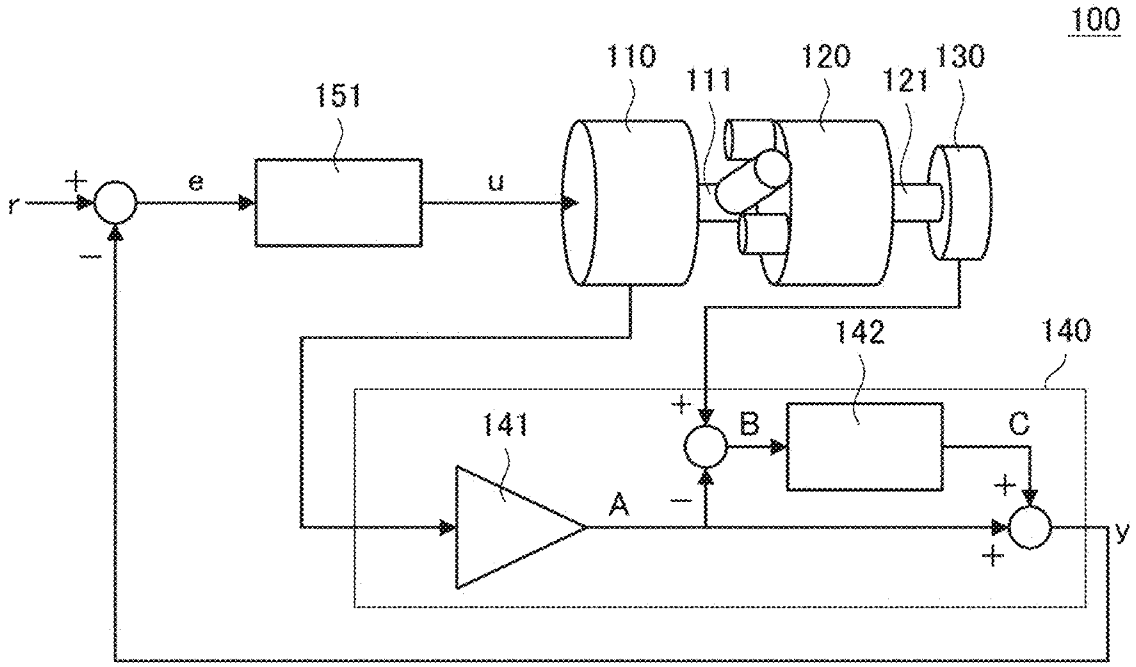
FIG. 3 is a schematic diagram illustrating a configuration example of the actuator device according to the embodiment.

Next, a configuration example of the actuator device 100 according to the present embodiment will be described with reference to FIG. 3. FIG. 3 is a schematic diagram illustrating a configuration example of the actuator device 100 according to the present embodiment.

As illustrated in FIG. 3, the actuator device 100 includes a control circuit 151, the motor 110, the gearbox 120, an angle sensor 130, and a feedback circuit 140.

The control circuit 151 generates a drive command for driving the motor 110. Specifically, the control circuit 151 may generate a control command by proportional-integral-differential (PID) control.

For example, a target that a control amount y of the output shaft 121 of the gearbox 120 is caused to follow is referred to as a target value r, and an input amount to the motor 110 used to obtain the target value is referred to as a manipulation amount u. In such a case, the control circuit 151 can generate a control command for instructing the manipulation amount u proportional to each of a deviation e, which is a difference between the target value r and the control amount y, the integral of the deviation e, and the derivative of the deviation e. The control to the manipulation amount u proportional to the deviation e is also referred to as a P operation, the control to the manipulation amount u proportional to the integral of the deviation e is also referred to as an I operation, and the control to the manipulation amount u proportional to the derivative of the deviation e is also referred to as a D operation.

The motor 110 rotates the motor shaft 111 on the basis of the control command from the control circuit 151, and controls the rotation angle of the motor shaft 111 on the basis of the control command from the control circuit 151. As described above, the motor 110 is not a brushed motor that rotates a rotor by switching the direction of the magnetic pole of the rotor with a physical switch, but is a brushless motor that rotates the rotor by switching the magnetic field generated from a stator with an electronic switch. That is, the internal information of the motor 110 used to drive the motor 110 is information used when the magnetic field generated in the motor 110 is switched by an electronic switch.

For example, in the brushless motor, the magnetic field generated in the motor 110 is detected using a Hall sensor, and the magnetic field generated from the stator is switched on the basis of the detected magnetic field. More specifically, in the brushless motor, three Hall sensors are provided inside, the angle of the rotor is detected according to a combination of the magnetic fields detected by the three respective Hall sensors, and the magnetic field generated from the stator is switched according to the angle of the rotor. With this configuration, the brushless motor can rotate the rotor both clockwise and counterclockwise.

In such a case, the internal information of the motor 110 is information regarding the magnetic field generated inside the motor 110. For example, the internal information of the motor 110 is sensing information of a magnetic field generated inside the motor 110 detected by a magnetic sensor (for example, a Hall sensor) provided inside the motor 110. In addition, as another example, the internal information of the motor 110 is sensing information of a current sensor that detects a current flowing through a stator that generates a magnetic field in the motor 110.

The actuator device 100 estimates the angle of the motor shaft 111 before input to the gearbox 120 on the basis of the internal information of the motor 110 described above, and uses the estimated angle of the motor shaft 111 for feedback generation by the feedback circuit 140. Note that since the estimated angle of the motor shaft 111 is a rotation angle derived from the information regarding the electric control of the motor 110, it is also referred to as an electrical angle.

The gearbox 120 mechanically decelerates or accelerates the torque input from the motor shaft 111, and outputs the decelerated or accelerated torque to the output shaft 121. The gearbox 120 may decelerate or accelerate the torque using, for example, mechanical elements having teeth in mesh such as gears, bevel gears, worm gears, and sprockets.

However, in the gearbox 120, an angular error occurs between the input motor shaft 111 and the output shaft 121 due to the backlash of meshing with the motor shaft 111 or the backlash of meshing inside the gearbox 120. The actuator device 100 can control the rotation angle of the output shaft 121 with higher accuracy by deriving an angle error between the motor shaft 111 and the output shaft 121 by the feedback circuit 140 and feeding the angle error back to the control of the motor 110.

The angle sensor 130 detects a rotation angle of the output shaft 121 of the gearbox 120. The angle sensor 130 may be, for example, an encoder, a potentiometer, a tunnel magneto resistance (TMR) sensor, or the like capable of detecting a rotation angle or a rotational movement amount of the output shaft 121. Note that the angle sensor 130 is not limited to the above sensor as long as it can detect the rotation angle of the output shaft 121 of the gearbox 120, and may be another sensor.

The feedback circuit 140 generates feedback for control of the motor 110 on the basis of the internal information of the motor 110 acquired from the motor 110 and the rotation angle of the output shaft 121 acquired from the angle sensor 130.

Specifically, the feedback circuit 140 first estimates the rotation angle of the motor shaft 111 on the basis of the internal information of the motor 110. For example, the feedback circuit 140 may estimate the rotation angle of the motor shaft 111 on the basis of information regarding the magnetic field inside the motor 110 detected by a Hall sensor or the like. The estimated rotation angle of the motor shaft 111 may be a so-called electrical angle.

Next, the feedback circuit 140 estimates a rotation angle (A) of the output shaft 121 by coordinate-transforming the estimated rotation angle of the motor shaft 111 through an amplifier 141. Specifically, the feedback circuit 140 estimates the rotation angle (A) of the output shaft 121 by multiplying the estimated rotation angle of the motor shaft 111 by the reciprocal of the gear ratio of the gearbox 120.

Subsequently, the feedback circuit 140 derives a difference (B) between the rotation angle (A) of the output shaft 121 estimated from the internal information of the motor 110 and the rotation angle of the output shaft 121 detected by the angle sensor 130.

Next, the feedback circuit 140 generates a backlash difference (C) by processing the difference (B) through a low-pass filter 142 which attenuates components of a predetermined frequency or higher. The difference (B) includes a vibration component caused by the backlash between the motor shaft 111 and the gearbox 120 and the backlash inside the gearbox 120, and a bias error component. Therefore, by processing the difference (B) through the low-pass filter 142 to remove the high-frequency vibration component included in the difference (B), the feedback circuit 140 can generate the backlash difference (C) including only the bias error component.

Thereafter, the feedback circuit 140 adds the generated backlash difference (C) to the rotation angle (A) of the output shaft 121 estimated from the internal information of the motor 110. The backlash difference (C) includes only the angle error caused by the backlash between the motor shaft 111 and the gearbox 120 and the backlash inside the gearbox 120. On the other hand, the rotation angle (A) of the output shaft 121 estimated from the internal information of the motor 110 does not include the angle error caused by the backlash. Therefore, by adding the backlash difference (C) to the estimated rotation angle (A) of the output shaft 121, the feedback circuit 140 can derive the rotation angle of the output shaft 121 which does not include the vibration component caused by the backlash, in which only the angle error (bias error) caused by the backlash is taken into account.

In general, in a control system in which a deviation or the like is included in an output, the deviation is minimized by feedback or the like. However, since the detection of the deviation and the feedback to the control system necessitate the detection of the deviation, the feedback is delayed and the overcorrection due to the feedback is likely to occur. In the technology according to the present disclosure, the control is performed with the deviation preliminarily incorporated on the premise that there is the deviation, so that occurrence of control delay or deterioration can be prevented.

In the actuator device 100 according to the present embodiment, the rotation angle of the output shaft 121 finally derived by the feedback circuit 140 does not include noise due to vibration caused by the backlash or delay. Therefore, the feedback circuit 140 can control the rotation angle of the output shaft 121 with higher accuracy by feeding back the rotation angle of the output shaft 121, to which the backlash difference (C) has been added, as the control amount y to the control system for the motor 110.

On the other hand, for example, in a case where the rotation angle of the output shaft 121 detected by the angle sensor 130 is directly fed back to the control system for the motor 110 as the control amount y, the control amount y includes a vibration component caused by the backlash as noise. In such a case, the control of the motor 110 is disturbed by the noise, which increases variation in the rotation angle of the output shaft 121.

In addition, for example, in a case where the rotation angle (A) of the output shaft 121 estimated from the internal information of the motor 110 is fed back to the control system of the motor 110 as the control amount y, a control deviation occurs in the rotation angle of the output shaft 121. This is because an angle error (bias error) caused by the backlash is generated between the estimated rotation angle (A) of the output shaft 121 and the actual rotation angle of the output shaft 121, and thus the estimated rotation angle (A) of the output shaft 121 and the actual rotation angle of the output shaft 121 may deviate from each other.

The actuator device 100 according to the present embodiment can feed back the rotation angle of the output shaft 121 as the control amount y to the control system for the motor 110, in which the vibration component caused by the backlash is not included but the backlash difference (C) being an angle error caused by the backlash is taken into account. Therefore, the actuator device 100 can control the rotation angle of the output shaft 121 with reduced noise and reduced error.

Furthermore, the information processing executed by the feedback circuit 140 is simple information processing such as amplification, addition, subtraction, and filtering. Therefore, the feedback circuit 140 of the actuator device 100 can be configured with simple software or an electric circuit. Therefore, the actuator device 100 can control the rotation angle of the output shaft 121 with high accuracy at lower cost.

Therefore, the actuator device 100 according to the present embodiment can control the rotation angle of the output shaft 121 with high accuracy without any angle sensor that detects the rotation angle of the motor shaft 111. Accordingly, the actuator device 100 can be reduced in cost, weight, and volume of the angle sensor.

Furthermore, in the actuator device 100 according to the present embodiment, the backlash difference (C), which is an angle error caused by the backlash of the gearbox 120, is derived. In this regard, the backlash differences (C) caused by the backlash of the gearbox 120 converge to a substantially constant value on the basis of the accuracy of the mechanical structure of the gearbox 120. Therefore, by monitoring the derived backlash differences (C), the actuator device 100 can detect an abnormality such as wear or damage of the mechanical structure of the gearbox 120 at an early stage. Specifically, the actuator device 100 can determine that damage or the like has occurred in the mechanical structure of the gearbox 120 in a case where the backlash difference (C) has increased. With this configuration, the actuator device 100 can also improve the safety and reliability of the gearbox 120.

The value of the backlash difference (C) is a value that depends on the internal structure of the actuator device 100, and is basically a constant value or a value that slightly vibrates. Therefore, a large variation in the value of the backlash difference (C) is considered to indicate that an abnormality has occurred in the internal structure of the actuator device 100. Therefore, by detecting the variation in the backlash difference (C), the actuator device 100 can detect an occurrence of an abnormality such as lack of a gear teeth of the gearbox 120, deformation of the rotation shaft of the gearbox 120, or a loose connection between the motor 110 and the gearbox 120. In addition, in a case where the actuator device 100 is a wave gear device, the actuator device 100 can detect an occurrence of ratcheting (tooth jumping) due to overload torque by detecting the variation in the backlash difference (C).

3. Control Method

Figure 4:
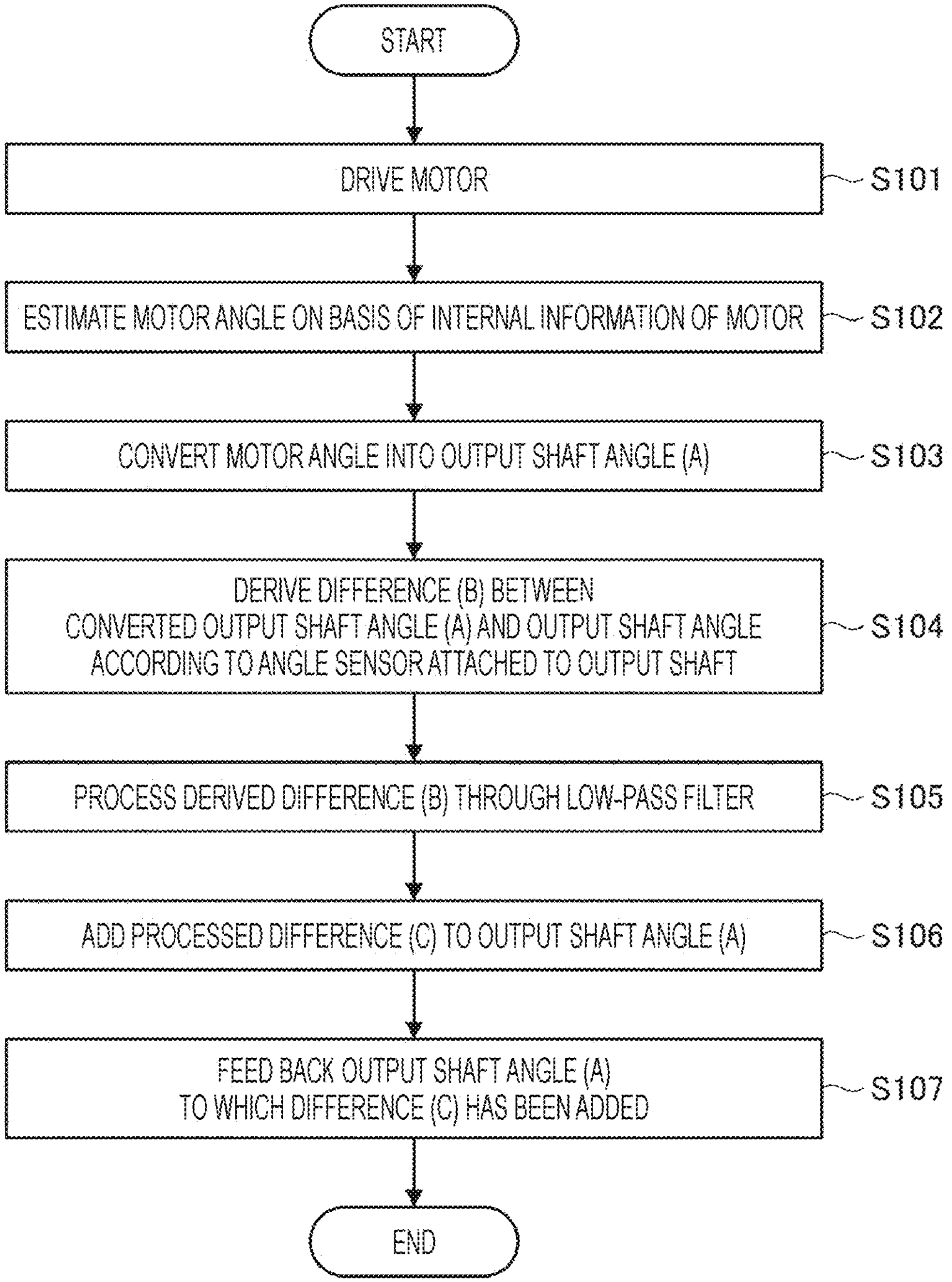
FIG. 4 is a flowchart illustrating a control flow of the actuator device according to the embodiment.

Next, a method of controlling the actuator device 100 according to the present embodiment will be described with reference to FIG. 4. FIG. 4 is a flowchart illustrating a control flow of the actuator device 100 according to the present embodiment.

First, the motor 110 is driven by the control circuit 151 as illustrated in FIG. 4 (S101). The torque generated by the drive of the motor 110 is input to the gearbox 120 via the motor shaft 111 to be decelerated or accelerated, and output to the output shaft 121.

At this time, the feedback circuit 140 estimates the rotation angle of the motor shaft 111 of the motor 110 on the basis of the internal information of the motor 110 (S102). For example, the feedback circuit 140 may estimate the angle of the motor shaft 111 on the basis of information regarding the magnetic field inside the motor 110 detected by a Hall sensor or the like.

Subsequently, the feedback circuit 140 converts the estimated rotation angle of the motor shaft 111 into the rotation angle (A) of the output shaft 121 (S103). For example, the feedback circuit 140 may estimate the rotation angle (A) of the output shaft 121 by coordinate-transforming the estimated rotation angle of the motor shaft 111 through the amplifier 141.

Next, the feedback circuit 140 derives the difference (B) between the rotation angle (A) of the output shaft 121 estimated from the internal information of the motor 110 and the rotation angle of the output shaft 121 detected by the angle sensor 130 (S104).

Subsequently, the feedback circuit 140 generates the backlash difference (C) by processing the derived difference (B) through the low-pass filter 142 (S105), and adds the generated backlash difference (C) to the rotation angle (A) of the output shaft 121 estimated from the internal information of the motor 110 (S106).

Thereafter, the feedback circuit 140 feeds the rotation angle of the output shaft 121, to which the backlash difference (C) has been added, back to the control system for the motor 110 (S107). With this configuration, the control circuit 151 can control the drive of the motor 110 on the basis of the estimated rotation angle of the output shaft 121 with higher accuracy.

According to the above operation, the actuator device 100 can control the rotation angle of the output shaft 121 with higher accuracy.

4. Application Example

Figure 5:
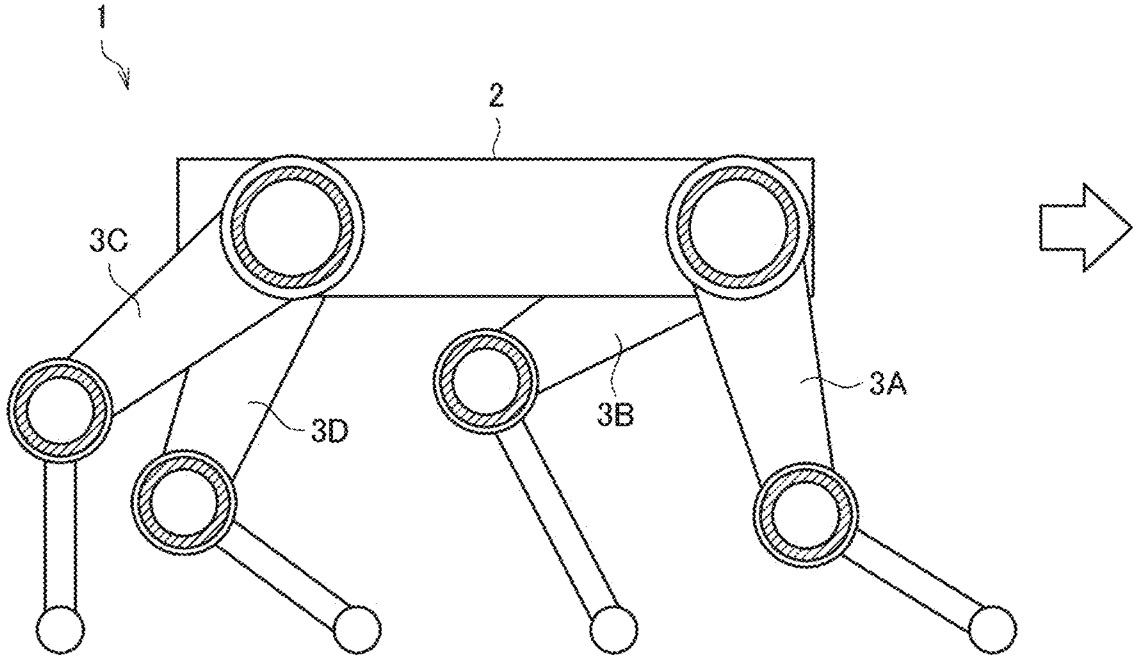
FIG. 5 is a schematic view illustrating an example of a mobile object to which the actuator device according to the embodiment is applied.

Furthermore, an application example of the actuator device 100 according to the present embodiment will be described with reference to FIG. 5. FIG. 5 is a schematic view illustrating an example of a mobile object to which the actuator device 100 according to the present embodiment is applied.

As illustrated in FIG. 5, the actuator device 100 according to the present embodiment may be applied to a mobile object 1 such as a legged walking robot.

The mobile object 1 is, for example, a robot having legs in which a plurality of links is connected by joints so as to be rotatably or linearly movable. The mobile object 1 includes, for example, a body 2 and legs 3A, 3B, 3C, and 3D connected to the body 2 via joints. The mobile object 1 can walk by the legs 3A, 3B, 3C, and 3D by moving the legs 3A, 3B, 3C, and 3D in conjunction with one another.

The actuator device 100 according to the present embodiment may be provided, for example, at each of joints connecting the body 2 and the legs 3A, 3B, 3C, and 3D. With this configuration, the actuator device 100 can move the legs 3A, 3B, 3C, and 3D with respect to the body 2 by driving each of the joints. Furthermore, the actuator device 100 may be provided, for example, in each of joints connecting the plurality of links of the legs 3A, 3B, 3C, and 3D. With this configuration, the actuator device 100 can perform the walking operation by moving the legs 3A, 3B, 3C, and 3D by driving each of the joints.

In the mobile object 1, a large number of joints driven by an actuator device are provided in the legs 3A, 3B, 3C, and 3D in order to perform legged walking. Since the actuator device 100 according to the present embodiment is further reduced in cost, weight, and volume, it can be suitably applied to the mobile object 1 provided with a large number of such joints. With this configuration, the actuator device 100 according to the present embodiment can further reduce the cost of the mobile object 1 and further reduce the load during the operation of the mobile object 1.

However, the actuator device 100 according to the present embodiment is applicable not only to the mobile object 1 described above but also to other objects. The actuator device 100 according to the present embodiment may be provided, for example, at a joint of a humanoid or animal-shaped robot. Furthermore, the actuator device 100 according to the present embodiment can be applied to various mechanical devices provided with a movable portion driven by torque from a motor.

The preferred embodiments of the present disclosure have been described above in detail with reference to the accompanying drawings, but the technical scope of the present disclosure is not limited to such examples. It is obvious that those with ordinary skill in the technical field of the present disclosure may conceive various modifications or corrections within the scope of the technical idea recited in claims, and it is naturally understood that they also fall within the technical scope of the present disclosure.

Furthermore, the effects described in this specification are merely exemplary or illustrative, and not restrictive. That is, the technology according to the present disclosure can exhibit other effects apparent to those skilled in the art from the description of this specification, in addition to the effects described above or instead of the effects described above.

Note that the following configurations also fall within the technological scope of the present disclosure.

(1)

An actuator device including:

a motor whose rotation is controlled by a drive circuit;

a gearbox that decelerates or accelerates torque of the motor;

an angle sensor that detects a rotation angle of an output shaft of the gearbox; and a feedback circuit that generates feedback for control of the motor on the basis of internal information of the motor used in the drive circuit and the rotation angle of the output shaft detected by the angle sensor.

(2)

The actuator device according to (1), in which the motor is a brushless motor.

(3)

The actuator device according to (2), in which the internal information is information regarding a magnetic field generated in the motor.

(4)

The actuator device according to (3), in which the internal information is information detected by a Hall sensor included in the motor.

(5)

The actuator device according to (4), in which the internal information is information regarding an electrical angle of the motor.

(6)

The actuator device according to any one of (1) to (5), in which the gearbox includes a mechanical element having a backlash.

(7)

The actuator device according to any one of (1) to (6), in which the feedback circuit generates the feedback by deriving a difference between the rotation angle of the output shaft estimated from the internal information and the detected rotation angle of the output shaft, and adding the derived difference to the estimated rotation angle of the output shaft.

(8)

The actuator device according to (7), in which the derived difference includes a vibration component caused by the backlash of the gearbox and a bias error component.

(9)

The actuator device according to (7) or (8), in which the derived difference is subjected to signal processing through a low-pass filter which attenuates a component of a predetermined frequency or higher.

(10)

The actuator device according to (9), in which the difference subjected to the signal processing through the low-pass filter is used for detection of an abnormality in the actuator device.

(11)

The actuator device according to any one of (7) to (10), in which the rotation angle of the output shaft estimated from the internal information is an angle obtained by dividing the angle of the motor estimated from the internal information by a gear ratio of the gearbox.

(12)

A method of controlling an actuator device, the method including:

controlling rotation of a motor of the actuator device by a drive circuit;

decelerating or accelerating torque of the motor by a gearbox of the actuator device;

detecting a rotation angle of an output shaft of the gearbox by an angle sensor; and generating feedback for control of the motor by a feedback circuit on the basis of internal information of the motor used in the drive circuit and the rotation angle of the output shaft detected by the angle sensor.

(13)

A mobile object including an actuator device, the actuator device including:

a motor whose rotation is controlled by a drive circuit;

a gearbox that decelerates or accelerates torque of the motor;

an angle sensor that detects a rotation angle of an output shaft of the gearbox; and a feedback circuit that generates feedback for control of the motor on the basis of internal information of the motor used in the drive circuit and the rotation angle of the output shaft detected by the angle sensor.

REFERENCE SIGNS LIST

1 Mobile object
2 Body
3A, 3B, 3C, 3D Leg
4 Head
5 Tail
100 Actuator device
110 Motor
111 Motor shaft

120 Gearbox
121 Output shaft
130 Angle sensor
140 Feedback circuit
141 Amplifier
142 Low-pass filter
151 Control circuit

The invention claimed is:

1. An actuator device, comprising:
a drive circuit;
a motor, wherein the drive circuit is configured to control rotation of the motor;
a gearbox configured to one of decelerate or accelerate torque of the motor;
an angle sensor configured to detect a first rotation angle of an output shaft of the gearbox; and
a feedback circuit configured to:
acquire internal information of the motor;
estimate a second rotation angle of the output shaft based on the internal information of the motor;
derive a difference between the detected first rotation angle of the output shaft and the estimated second rotation angle of the output shaft;
add the derived difference to the estimated second rotation angle of the output shaft; and
generate feedback for control of the motor, wherein the generation of the feedback for the control of the motor is based on the derived difference between the detected first rotation angle of the output shaft and the estimated second rotation angle of the output shaft, and the addition of the derived difference to the estimated second rotation angle of the output shaft.

2. The actuator device according to claim 1, wherein the motor is a brushless motor.

3. The actuator device according to claim 2, wherein the motor is configured to generate magnetic field, and the internal information is regarding the generated magnetic field.

4. The actuator device according to claim 3, wherein the motor includes a Hall sensor configured to detect the internal information regarding the generated magnetic.

5. The actuator device according to claim 4, wherein the internal information is regarding an electrical angle of a motor shaft of the motor.

6. The actuator device according to claim 1, wherein the gearbox includes a mechanical element having a backlash.

7. The actuator device according to claim 1, wherein
the derived difference includes a vibration component caused by a backlash of the gearbox and a bias error component, and
the bias error component is associated with the gearbox.

8. The actuator device according to claim 1, further comprising a low-pass filter configured to attenuate a component of one of a specific frequency or a frequency greater than the specific frequency, wherein the derived difference is subjected to signal processing through the low-pass filter.

9. The actuator device according to claim 8, wherein the derived difference subjected to the signal processing through the low-pass filter is for detection of an abnormality in the actuator device.

10. The actuator device according to claim 1, wherein
the feedback circuit is further configured to:
estimate an angle of the motor based on the internal information, and
obtain the estimated second rotation angle of the output shaft based on division of the estimated angle of the motor by a gear ratio of the gearbox.

11. A method of controlling an actuator device, the method comprising:
controlling, by a drive circuit, rotation of a motor of the actuator device;
decelerating or accelerating torque of the motor by a gearbox of the actuator device;
detecting, by an angle sensor, a first rotation angle of an output shaft of the gearbox;
acquiring, by a feedback circuit of the actuator device, internal information of the motor;
estimating, by the feedback circuit, a second rotation angle of the output shaft based on the internal information of the motor;
deriving, by the feedback circuit, a difference between the detected first rotation angle of the output shaft and the estimated second rotation angle of the output shaft;
adding, by the feedback circuit, the derived difference to the estimated second rotation angle of the output shaft; and
generating, by the feedback circuit, feedback for control of the motor, wherein the generation of the feedback for the control of the motor is based on the derived difference between the detected first rotation angle of the output shaft and the estimated second rotation angle of the output shaft, and the addition of the derived difference to the estimated second rotation angle of the output shaft.

12. A mobile object comprising an actuator device, wherein the actuator device comprising:
a drive circuit;
a motor, wherein the drive circuit is configured to control rotation of the motor;
a gearbox configured to one of decelerate or accelerate torque of the motor;
an angle sensor configured to detect a first rotation angle of an output shaft of the gearbox; and
a feedback circuit configured to:
acquire internal information of the motor;
estimate a second rotation angle of the output shaft based on the internal information of the motor;
derive a difference between the detected first rotation angle of the output shaft and the estimated second rotation angle of the output shaft;
add the derived difference to the estimated second rotation angle of the output shaft; and
generate a feedback for control of the motor, wherein the generation of the feedback for the control of the motor is based on the derived difference between the detected first rotation angle of the output shaft and the estimated second rotation angle of the output shaft, and the addition of the derived difference to the estimated second rotation angle of the output shaft.

* * * * *